(12) United States Patent
Kondo et al.

(10) Patent No.: US 6,834,339 B2
(45) Date of Patent: Dec. 21, 2004

(54) MICROPROCESSOR

(75) Inventors: Shuji Kondo, Ibaraki (JP); Yoji Okabe, Nagaokakyo (JP); Hiroaki Asada, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 441 days.

(21) Appl. No.: 10/138,148

(22) Filed: May 3, 2002

(65) Prior Publication Data

US 2002/0169948 A1 Nov. 14, 2002

(30) Foreign Application Priority Data

May 8, 2001 (JP) ........................................ 2001-137679

(51) Int. Cl.$^7$ ............................................. G06F 9/46
(52) U.S. Cl. ...................................... 712/245
(58) Field of Search ........................................ 712/245

(56) References Cited

U.S. PATENT DOCUMENTS

| | | | | |
|---|---|---|---|---|
| 4,975,839 A | * | 12/1990 | Nakatsuka et al. | ......... 712/211 |
| 5,300,831 A | * | 4/1994 | Pham et al. | ................... 326/44 |
| 5,335,331 A | * | 8/1994 | Murao et al. | ............... 712/213 |
| 5,672,984 A | * | 9/1997 | Ando et al. | ................... 326/39 |
| 6,237,101 B1 | * | 5/2001 | Moore et al. | ............... 713/320 |
| 6,658,638 B2 | * | 12/2003 | Shau | ........................... 716/16 |
| 6,681,378 B2 | * | 1/2004 | Wang et al. | .................. 716/17 |

* cited by examiner

Primary Examiner—Eric Coleman
(74) Attorney, Agent, or Firm—Merchant & Gould P.C.

(57) ABSTRACT

A microprocessor is provided whose power consumption is reduced optimally according to an execution instruction code and an operational mode. In addition to a first PLA used in a normal operation, a second PLA dedicated for execution of certain instructions frequently used in a slow mode is provided. When instruction codes and state signals to be executed in the slow mode match data set in the second PLA, the operation of the first PLA is stopped, and the microprocessor is controlled according to a microcode output from the second PLA.

6 Claims, 11 Drawing Sheets

MICROPROCESSOR

BACKGROUND OF THE INVENTION

1. Field of the Invention

The present invention relates generally to a technique for reducing the power consumption of a microprocessor.

2. Related Background Art

Many microprocessors have several operating modes such as a normal mode, a slow mode, and a stand-by mode as functions thereof. In a mode such as the slow mode in which a low power consumption is assumed, it is likely that instructions to be executed are limited to relatively fewer kinds and are executed repeatedly. However, the circuit scales of programmable logic arrays (PLAs) that operate are unchanged even though only limited instructions are executed, which means that unnecessary power consumption occurs even in the slow mode.

The following will describe a conventional microprocessor.

FIG. 10 is a block diagram illustrating a schematic configuration of a common microprocessor.

100 is a CPU, which is connected with external circuits such as a ROM 500, a RAM 600, and a peripheral circuit 700 via buses. The CPU 100 includes an instruction decoder 400, a data path 300, and a bus interface 200, so that data communication with the external circuit or within the CPU is carried out via the bus interface 200.

Next, a common operation will be described. Data input from the ROM 500 are fed into the instruction decoder 400 via the bus interface 200, and are divided into an instruction code and operand data by an instruction buffer 800. The instruction code output from the instruction buffer 800 is fed into an instruction code conversion circuit 900 and is supplied as a microcode to the bus interface 200, the data path 300, and the instruction decoder 400. Each block operates according to the microcode supplied thereto.

FIG. 11 is a block diagram illustrating a configuration of a conventional instruction code conversion circuit 900.

It should be noted that in FIG. 11, T1 and T2 denote latch timings in accordance with a system clock clk for latching signals supplied to the respective blocks. T1 is a falling edge of the system clock clk, and T2 is a rising edge of the system clock clk.

The instruction code conversion circuit 900 is a circuit block for converting an instruction code taken out of ROM data into a microcode. 910 denotes a status register that latches a state signal as a part of the microcode at timings T2.

920 denotes an instruction register that latches the instruction code output from the instruction buffer 800 shown in FIG. 10 at timings T2.

930 denotes a PLA that decodes an output signal from the instruction register 920 and the status register 910.

940 denotes a microcode output control register that latches a decode signal output from the PLA 930 at timings T1 and outputs a microcode.

The state signal and the instruction code are latched at timings T2 by the status register 910 and the instruction register 920, respectively, and are outputted to the PLA 930. The PLA 930 decodes output signals of the instruction register 920 and the status register 910, and outputs the decoded result as a decode signal. The microcode output control register 940 latches the decode signal at a timing T1 of the next cycle, and outputs the same as a microcode.

However, in the foregoing conventional microprocessor, in the case where instructions limited in number are executed repeatedly, as in the slow mode, power is wasted since all the PLA circuits operate.

SUMMARY OF THE INVENTION

Therefore, the present invention is to solve the aforementioned problems, and it is an object of the present invention to provide a microprocessor whose power consumption is reduced optimally according to an execution instruction code and an operation mode.

To achieve the foregoing object, a microprocessor according to the present invention includes a first PLA, a second PLA, a selecting means, and a control means. The first PLA outputs a first PLA microcode based on an instruction code and a state signal. The second PLA outputs a second PLA microcode and a comparison determination signal based on the instruction code, the state signal, and a slow mode setting signal The selecting means selects either the first PLA microcode or the second PLA microcode according to the comparison determination signal, and outputs the selected one as a microcode. The control means activates one of the first and second PLAs and deactivates the other according to the comparison determination signal. In the foregoing microprocessor, the second PLA processes several instructions among all the instructions to be processed by the first PLA, and includes a first register, a second register, and a comparison control circuit. The first register stores instruction codes and state signals for the several instructions. The second register stores microcodes that correspond to the instruction codes and the state signals stored in the first register. The comparison control circuit compares data in the first register with the instruction codes and the state signals inputted in the slow mode according to the slow mode setting signal, and outputs the comparison result as the comparison determination signal. In the case where the comparison determination signal indicates a matching state, the second PLA outputs the microcode corresponding to the matched data of the first register from the second register as a second PLA microcode.

In other words, considering that in the slow mode, instructions are relatively limited and the limited instructions are executed repetitively, a second PLA dedicated for the execution of limited instructions is provided in addition to the first PLA for the normal operation. Further, instruction codes, state signals, and microcodes corresponding to the instruction codes and state signals can be set arbitrarily in the second PLA, and in the case where the instruction codes and the state signals to be executed in the slow mode match the data set in the second PLA, the operation of the first PLA is stopped, while the microprocessor is controlled according to a microcode outputted from the second PLA.

This reduces the power consumption in the slow mode.

Furthermore, the control means (control circuit) preferably causes the first PLA to stop a circuit operation by fixing input data to be supplied to the first PLA according to the comparison determination signal.

Furthermore, the first register and the second register preferably are composed of ROMs. This makes it unnecessary for an external ROM of the microprocessor to have a program region for initialization, thereby allowing the capacity of the external ROM to decrease, and reducing the period of time for the initialization.

Furthermore, the control means (power source control circuit) preferably stops the power supply to the first PLA by switching the power supply to the first PLA or the second PLA according to the comparison determination signal. This prevents the generation of OFF leak current, thereby allowing the power consumption in the slow mode to be reduced further.

Furthermore, data in the first register (C register) preferably are rewritable at all times according to data in the instruction register and the status register, and data in the second register (D register) preferably are rewritable at all times according to the microcode. With this, by changing the values set into the first register and the second register dynamically, the power consumption can be reduced optimally according to an execution frequency of an instruction, irrespective of an operational mode.

Furthermore, it is preferable that frequently-executed instructions are extracted from a ROM source file, converted into ROM codes, and arranged in the second PLA. This allows the low power consumption to be achieved, and at the same time, even if the program development is carried out outside a microprocessor manufacturer, there is no need to disclose detailed information concerning performance and architecture of the microprocessor such as instruction codes, state data, and microcodes, thereby making it possible to maintain the confidentiality of information.

DETAILED DESCRIPTION OF THE INVENTION

Figure 1:
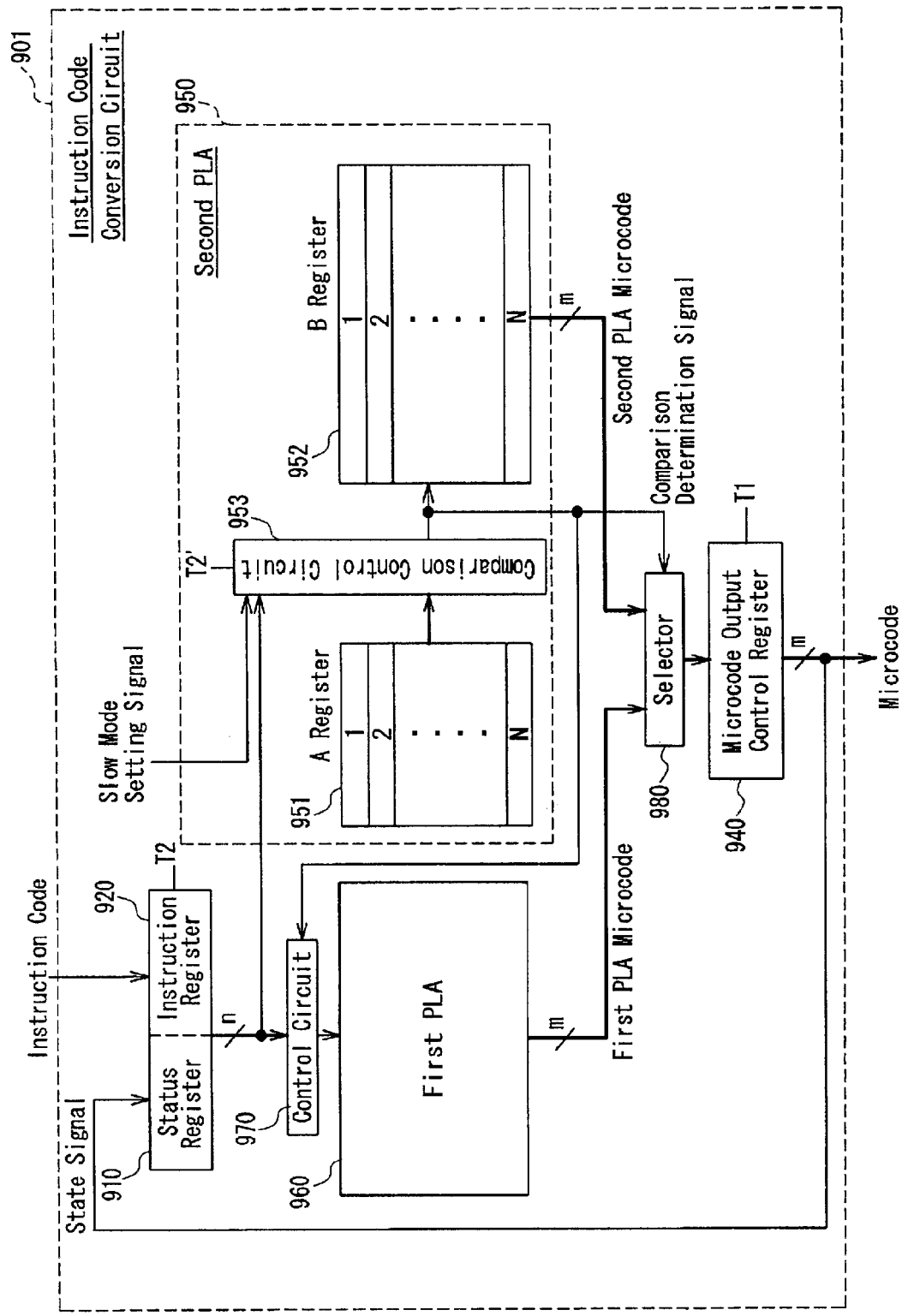
FIG. 1 is a block diagram illustrating a configuration of an instruction code conversion circuit 901 included in a microprocessor according to a first embodiment of the present invention.

The following will describe embodiments of the present invention while referring to FIGS. 1 to 8 and 10. It should be noted that T1 and T2 denote latch timings in accordance with a system clock clk, for latching signals inputted to the respective blocks, T1 and T2 being a falling edge and a rising edge of the system clock clk, respectively, and that T1' and T2' denote delay timings of T1 and T2, respectively. Additionally, an instruction code conversion circuit is denoted with a reference numeral 900 in FIG. 10, but the last digit of the reference numeral varies according to each embodiment.

First Embodiment

FIG. 1 is a block diagram illustrating a configuration of an instruction code conversion circuit 901 included in a microprocessor according to the first embodiment of the present invention.

Figure 11:
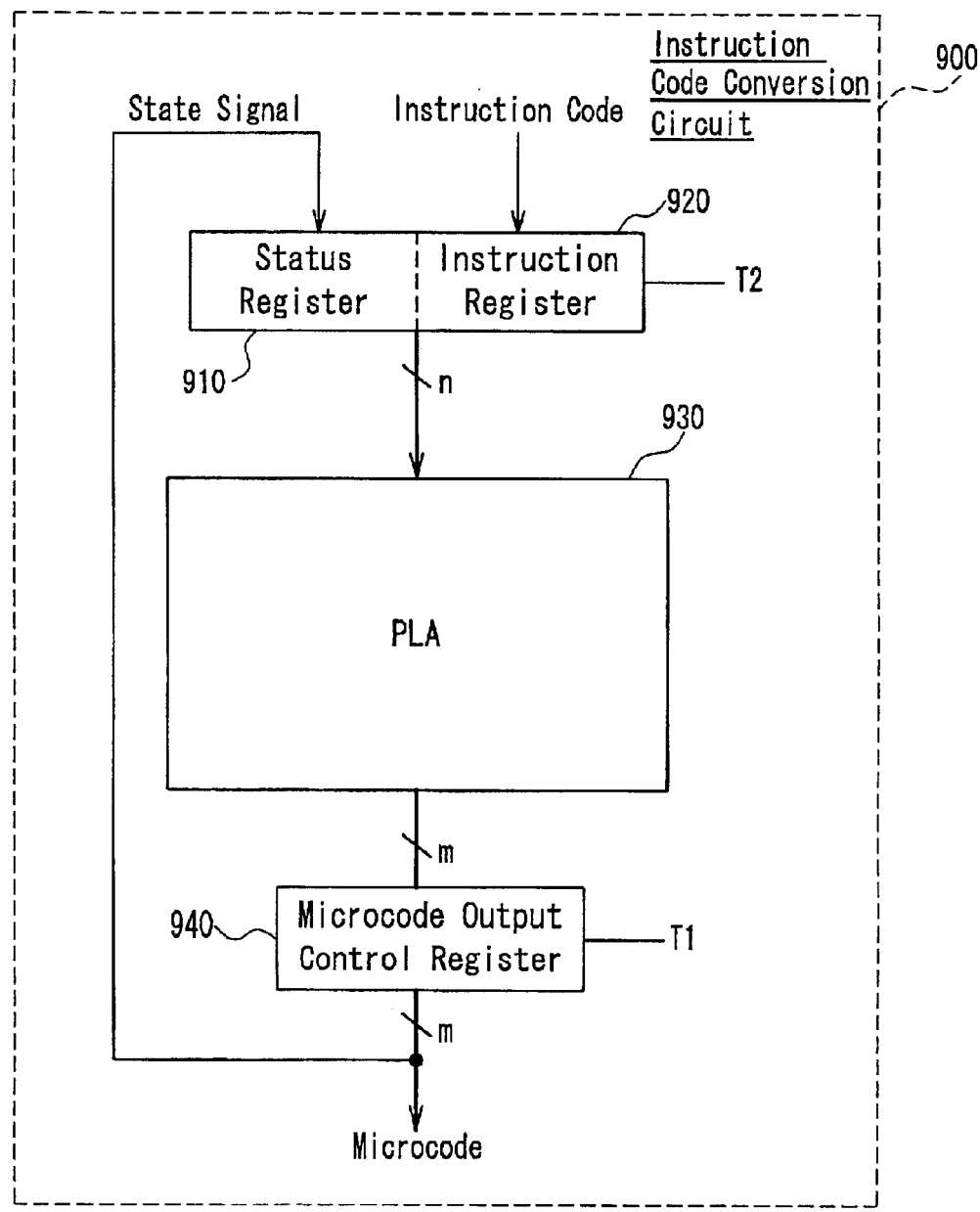
FIG. 11 is a block diagram illustrating a conventional instruction code conversion circuit 900.

In FIG. 1, 920 denotes an instruction register that has the same function as the instruction register shown in FIG. 11 and latches data from ROM data at timings T2, which data are divided and limited to an instruction code.

910 denotes a status register that has the same function as the status register shown in FIG. 11 and latches a state signal at timings T2. The instruction register 920 and the status register 910 are composed of n bits in total.

950 denotes a second PLA that receives as inputs thereto an output signal from the instruction register 920 and the status register 910 as well as a slow mode setting signal, and that outputs a second PLA microcode of m bits. The second PLA 950 includes an A register (first register) 951, a comparison control circuit 953, and a B register (second register) 952.

The A register 951 is a group of address-mapped registers that are rewritable by a program. The A register 951 has the same number of bits as the total number of bits of the instruction register 920 and the status register 910, namely n bits, and is composed of N stages. The A register 951 is capable of setting N cycles of an instruction code and a state signal that are used frequently in the slow mode.

953 denotes a comparison control circuit that is supplied with a slow mode setting signal, and compares the output signal from the instruction register 920 and the status register 910 with data in all stages of the A register 951 in parallel. The comparison control circuit 953 determines whether it is in a state such that the microprocessor is in the slow mode and the output data from the instruction register 920 and the status register 910 match data in any one of the N stages of the A register 951, or in another state. The comparison control circuit 953 latches the result of the determination at timings T2', and outputs the same as a comparison determination signal to the B register 952, a selector 980, and a control circuit 970.

The B register 952 also is a group of address-mapped registers that are rewritable by a program, like the A register 951. The B register 952 has the same number of bits as the number of bits of a microcode, namely m bits, is composed of the same number of stages as that of the A register, namely N stages, and is capable of setting microcode data corresponding to the instruction code and state signal set into the A register 951. Furthermore, in the case where the comparison determination signal indicates that the current mode is the slow mode and that data in the instruction register 920 and the status register 910 match data in a certain stage of the A register 951, the B register 952 outputs microcode data corresponding to the matched instruction, as a second PLA microcode.

970 denotes a control circuit that, according to the comparison determination signal, switches an operation applied to data in the instruction register 920 and the status register 910, between the transmission of the same directly to a first PLA 960 and the masking of the same. The control circuit 970 masks data in the instruction register 920 and the status register 910 when the comparison determination signal indicates the state in which the microprocessor is in the slow mode and the data in the instruction register 920 and the status register 910 match data in any one of the N stages of the A register 951. When the comparison determination signal indicates a state other than that, the control circuit 970 transmits the data directly to the first PLA 960.

960 denotes the first PLA 960, which has the same function as a conventional PLA 930 (FIG. 11) and is supplied with an output signal of n bits from the control circuit 970, and outputs a first PLA microcode of m bits.

980 denotes a selector that selectively outputs either the first PLA microcode or the second PLA microcode according to the comparative determination signal.

940 denotes a microcode output control register that latches an output signal of the selector 980 at timings T1 and outputs the same as a microcode. Furthermore, the microcode output control register 940 outputs a part of the microcode as a state signal to the status register 910.

The instruction code conversion circuit 901 according to the first embodiment has the following characteristic feature. When it is recognized that the data in the instruction register 920 and the status register 910 match data in any one of the N stages of the A register 951 in the slow mode, the data in the B register 952 is outputted as a microcode, and at the same time, the data in the instruction register 920 and the status register 910 that are to be supplied to the first PLA 960 are masked, so that the second PLA 950 is activated, whose power consumption is smaller than that of the first PLA 960. By doing so, the power consumption in the slow mode is reduced.

Next, an operation of the instruction conversion circuit 901 configured as above will be described below, with reference to the timing chart of FIG. 2.

Here, it is assumed that as initialization, the microprocessor sets instruction codes and state signals that correspond to several instructions used frequently in the slow mode into the A register 951, and sets microcodes into the B register 952.

Figure 2:
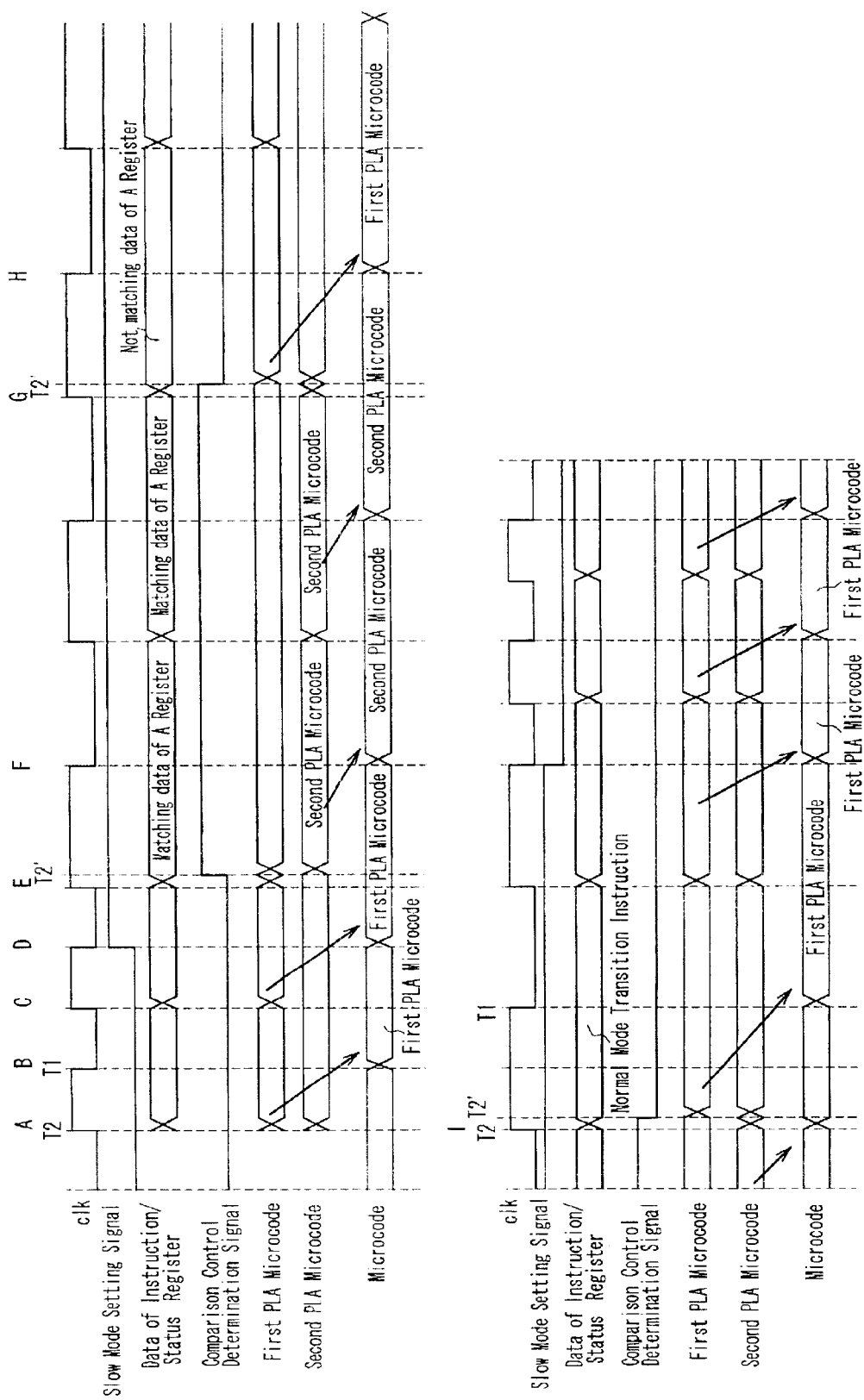
FIG. 2 is an operation timing chart of the instruction code conversion circuit 901 shown in FIG. 1.

At a timing A in FIG. 2, the slow mode setting signal has a logic "L", and the microprocessor operates in a normal mode. The instruction register 920 and the status register 910 latch an instruction code and a state signal, respectively, at timings T2 of the system clock clk. The comparison control circuit 953 outputs the logic "L" as a comparison determination signal since the slow mode setting signal has the logic "L". Since a logic "L" of the comparison determination signal indicates that the first PLA 960 is selected, the control circuit 970 transmits an output signal from the instruction register 920 and the status register 910 directly to the first PLA 960, and the first PLA 960 outputs a first PLA microcode as a decode signal. The selector 980 receiving the comparison determination signal with the logic "L" selects the first PLA microcode, and outputs the same.

At a timing B, the microcode output control register 940 latches an output signal of the selector 980 at a timing T1, and outputs the same as a microcode.

At a timing C, the same processing as that at the timings A is carried out.

At a timing D, a microcode corresponding to an instruction decoded at the timing C is outputted.

At the timing D, the slow mode setting signal is switched from the logic "L" to a logic "H". Since the data in the instruction register 920 and the status register 910 do not match the data in the A register 951 and the comparison determination signal maintains the logic "L", the first PLA microcode is selected by the selector 980, latched in the microcode output control register 940, and outputted as a microcode.

At a timing E, the system clock clk is caused to make a transition so as to have slow cycles, and when the data in the instruction register 920 and the status register 910 match the data in the first stage of the A register 951, the comparison determination signal switches from the logic "L" to the logic "H" at a timing T2', thus exhibiting a matching state. The B register 952 outputs a code in a first stage corresponding to the first stage of the A register 951 as a second PLA microcode at the timing T2', and the selector 980 selects and outputs the second PLA microcode. Furthermore, the control circuit 970 masks the output to the first PLA 960, so as to cause the first PLA 960 to stop the circuit operation.

At a timing F, the microcode output control register 940 latches the output signal of the selector 980 at timings T1, and outputs the second PLA microcode as a microcode.

The following will describe a case where the operation of the microprocessor is in the slow mode and transition occurs from a state in which an execution instruction code and data in the A register 951 match each other to a state in which they do not match.

When non-matching is confirmed at a timing G and the comparison determination signal is switched from the logic "H" to the logic "L" at a timing T2', as in the normal mode, data in the instruction register 920 and the status register 910 are transmitted to the first PLA 960, and the selector 980 selects the first PLA microcode.

At a timing H, the microcode output control register 940 latches an output signal of the selector 980, and outputs the first PLA microcode.

It should be acknowledged that, in the case of a timing I at which the slow mode and the matching state are switched to the normal mode, the execution of the instruction of making transition to the normal mode causes the comparison determination signal to exhibit a non-matching state at a timing T2', and therefore, the operation is the same as that in the case where transition occurs from the slow mode and the matching state to the non-matching state.

As described above, according to the present embodiment, when the microprocessor is in the slow mode, the second PLA 950, whose power consumption is smaller, operates while the first PLA whose power consumption is larger stops operating. Therefore, the reduction of the power consumption in the slow mode can be achieved.

Second Embodiment

Figure 3:
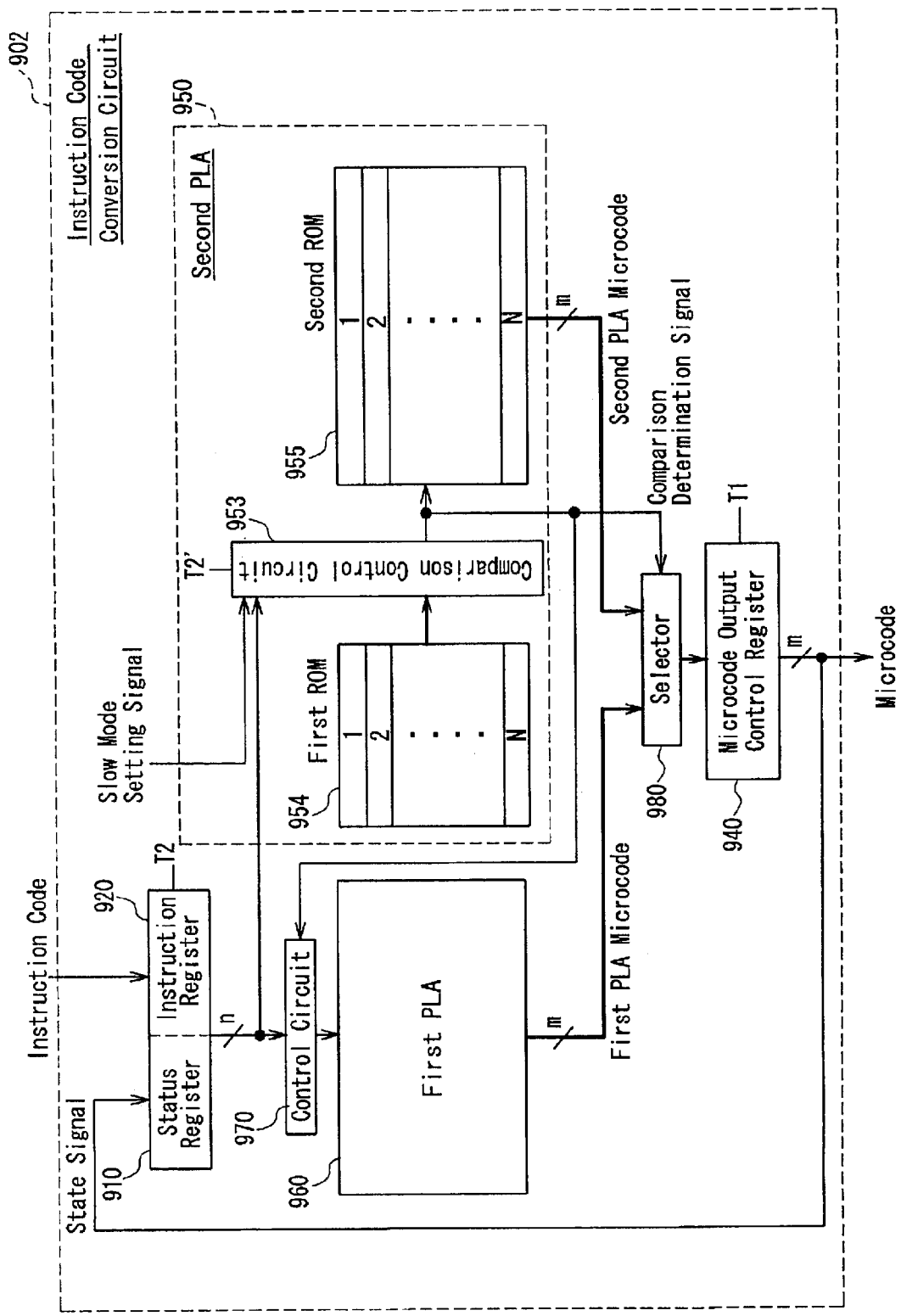
FIG. 3 is a block diagram illustrating a configuration of an instruction code conversion circuit 902 included in a microprocessor according to a second embodiment of the present invention.
Figure 4:
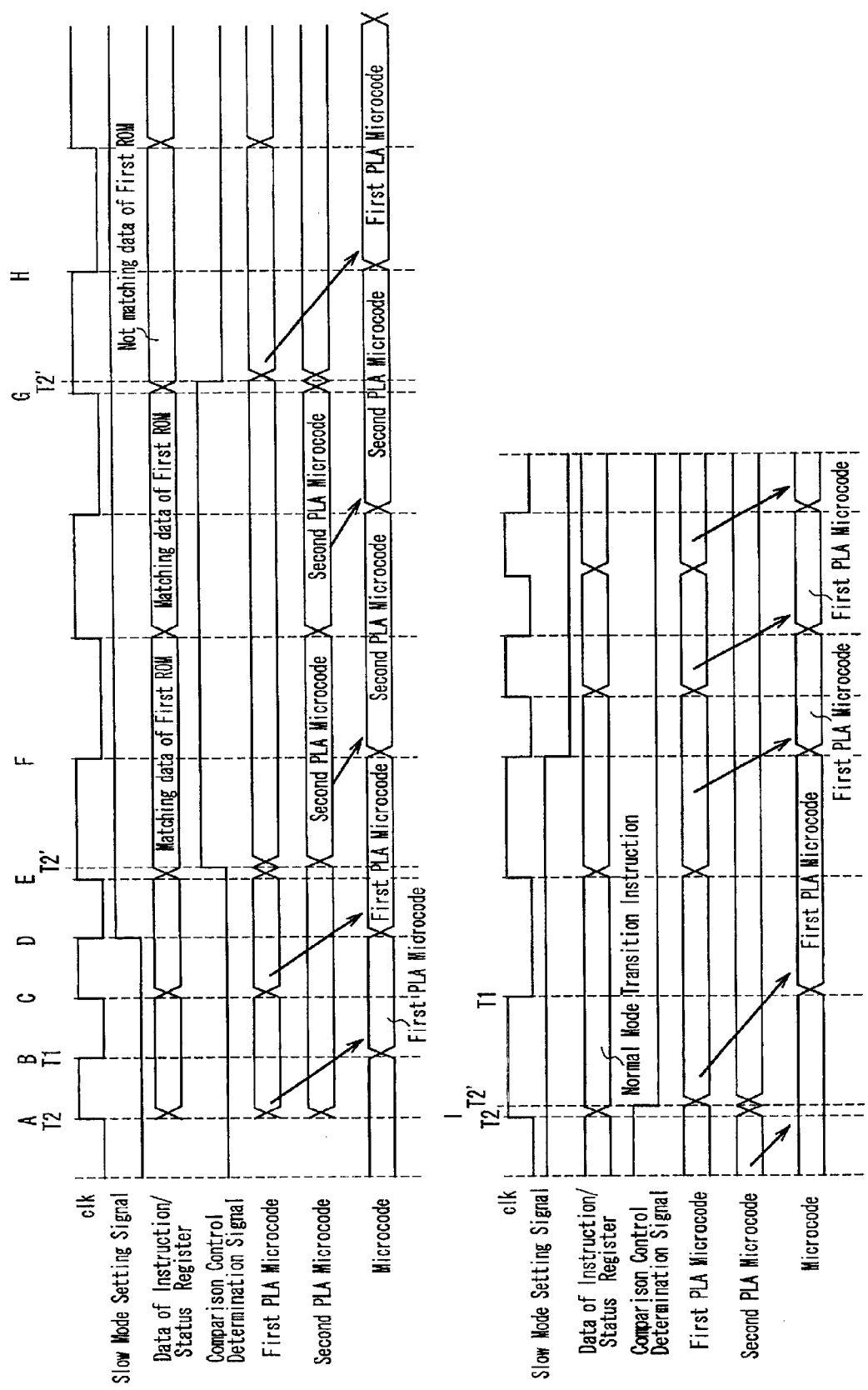
FIG. 4 is an operation timing chart of the instruction code conversion circuit 902 shown in FIG. 3.

FIG. 3 is a block diagram illustrating a configuration of an instruction code conversion circuit 902 included in a microprocessor according to the second embodiment of the present invention.

In FIG. 3, 954 denotes a first ROM that replaces the A register 951 in FIG. 1. Data in the first ROM 954 are set by mask patterning in a microprocessor manufacturing process, as those in the ROM 500 shown in FIG. 10, unlike those in the A register 951, which are set by programming.

955 is a second ROM that replaces the B register 952 in FIG. 1. Data in the second ROM 955 are set by mask patterning, as those of the first ROM 954.

As compared with the instruction code conversion circuit 901 in the first embodiment in which the ROM 500 is required to have a program capacity for initialization since data writing into the A register 951 and B register 952 is required for initialization of the microprocessor, the instruction code conversion circuit 902 according to the second embodiment does not need a program for initialization, since the A register 951 and the B register 952 are replaced with ROMs. Therefore, a period needed for the initialization can be reduced.

The operation timings of the instruction code conversion circuit 902 configured as described above are shown in FIG.

4. The present embodiment differs from the first embodiment only in that the A register 951 and the B register 952 are replaced with the first ROM 954 and the second ROM 955, respectively, and operations and functions of the constituent circuit blocks are completely identical. Therefore, descriptions on the operation timings are omitted herein.

As described above, according to the present embodiment in which the A register 951 and the B register 952 of the second PLA 950 of the first embodiment are replaced with ROMs, the capacity of the external ROM 500 can be reduced, while the period needed for initialization can be shortened.

Third Embodiment

Figure 5:
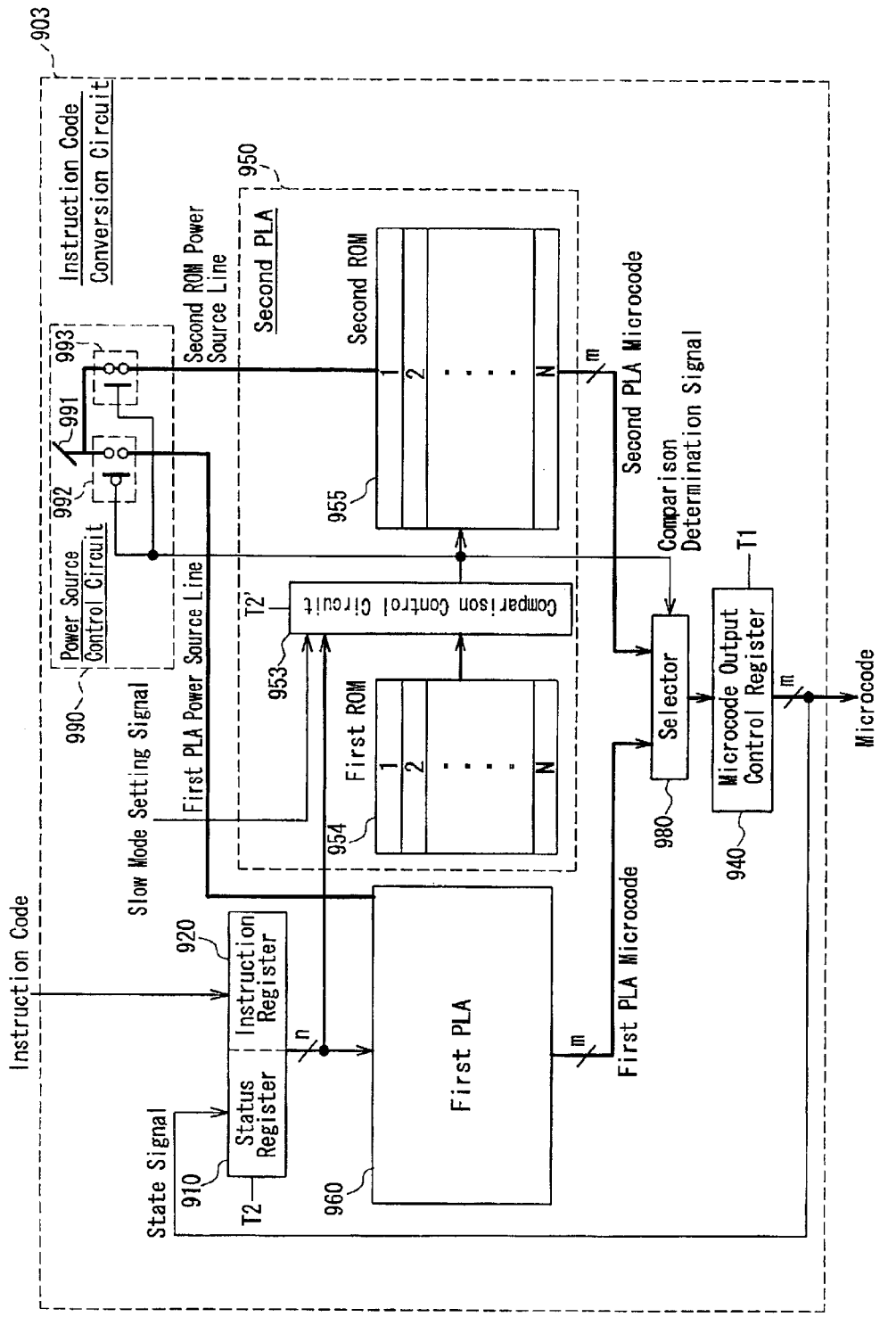
FIG. 5 is a block diagram illustrating a configuration of an instruction code conversion circuit 903 included in a microprocessor according to a third embodiment of the present invention.

FIG. 5 is a block diagram illustrating a configuration of an instruction code conversion circuit 903 included in a microprocessor according to the third embodiment of the present invention.

In FIG. 5, 990 denotes a power source control circuit that controls the switching between ON and OFF of the power supply to the first PLA 960 and the second ROM 955. The power source control circuit 990 is connected with the first PLA 960 via a first PLA power source line, and is connected with the second ROM 955 via a second ROM power source line.

991 denotes a main power source of the microprocessor that supplies power to the first PLA 960 via a first PLA power source switch 992, and supplies power to the second ROM 955 via a second ROM power source switch 993.

As compared with the instruction code conversion circuit 902 of the second embodiment, the instruction code conversion circuit 903 according to the third embodiment carries out the switching between the activation of the first PLA 960 and the activation of the second PLA 950 by controlling the power supply. The instruction code conversion circuit 903 according to the present embodiment recognizes that data in the instruction register 920 and the status register 910 match data in the first ROM 954 in the slow mode, and outputs data in the second ROM 955 as a microcode, and at the same time, stops the power supply to the first PLA 960, so as not only to activate the second PLA 950, whose power consumption is smaller, but also to prevent the generation of OFF leak current in the first PLA 960, which has a larger circuit scale. Therefore, the power consumption in the slow mode can be reduced further.

Next, an operation of the instruction code conversion circuit 903 configured as above will be described below, with reference to the timing chart of FIG. 6.

The following will describe a case in which, as in the first embodiment, the operation of the microprocessor switches from the normal mode to the slow mode, and an execution instruction code matches data in the first ROM 954.

Figure 6:
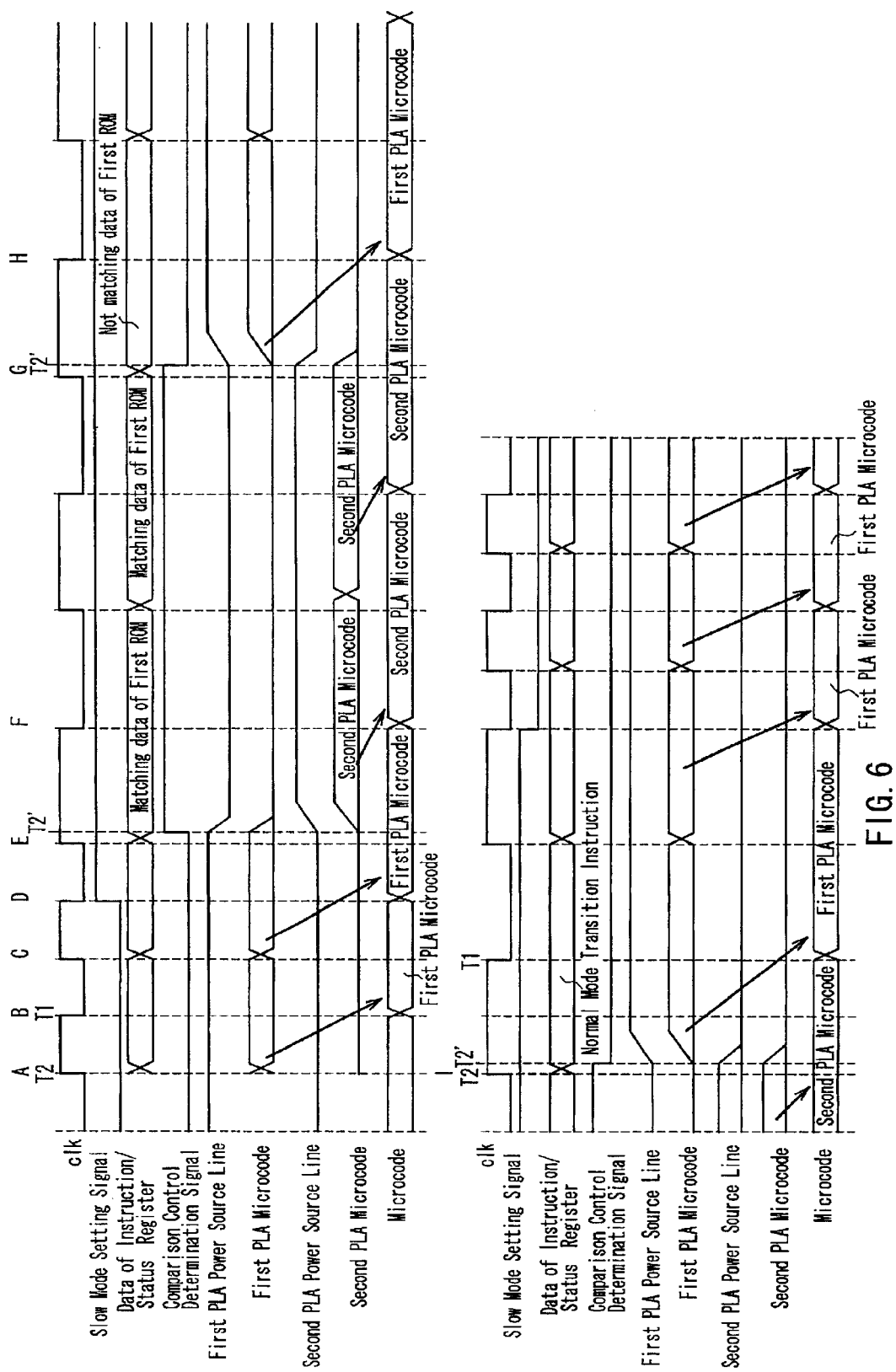
FIG. 6 is an operation timing chart of the instruction code conversion circuit 903 shown in FIG. 5.

At a timing A in FIG. 6, since the comparison determination signal has the logic "L", the first PLA power source switch 992 remains in the ON state while the second ROM power source switch 993 remains in the OFF state, and the selector 980 selects and outputs the first PLA microcode.

At timings B, C, and D, a state in which the first PLA 960 is selected is maintained, and the same operations as those in the first embodiment are carried out.

At a timing E, when the system clock clk is caused to make a transition so as to have slow cycles, the comparison determination signal is switched from the logic "L" to the logic "H" at a timing T2', and a state in which an execution instruction code matches data in the first ROM 954 is exhibited.

This causes the first PLA power source switch 992 to be turned OFF, thereby causing the first PLA 960 to stop its operation. At the same time, this causes the second ROM power source switch 993 to be turned ON, thereby supplying power to the second ROM 955. The second ROM 955 receives an output from the first ROM 954, and outputs a second PLA microcode.

Operations carried out at a timing F are identical to those in the first embodiment.

Next, the following will describe a case in which the operation of the microprocessor is in the slow mode, and a transition occurs from a state in which an execution instruction code and data in the first ROM 954 match each other to a state in which they do not match.

When non-matching is confirmed at a timing G and the comparison determination signal is switched from the logic "H" to the logic "L" at a timing T2', as in the normal mode, the second ROM power source switch 993 is turned OFF, and the second ROM 955 stops operating. The first PLA power source switch 992 is turned ON, and the first PLA 960 starts decoding, thereby outputting a first PLA microcode.

At a timing H, the same operations as those in the first embodiment are carried out.

In the case of a timing I at which the slow mode and the matching state are switched to the normal mode, as in the first embodiment, the execution of the instruction for making transition to the normal mode causes the comparison determination signal to exhibit a non-matching state at a timing T2', and therefore, the operation is the same as that in the case where transition occurs from the slow mode and the matching state to the non-matching state.

As stated above, according to the present embodiment, the switching control among a plurality of PLAs as in the second embodiment is carried out by switching power sources respectively dedicated to the PLAs. This prevents the generation of OFF leak current, and allows the power consumption in the slow mode to be reduced further.

Fourth Embodiment

Figure 7:
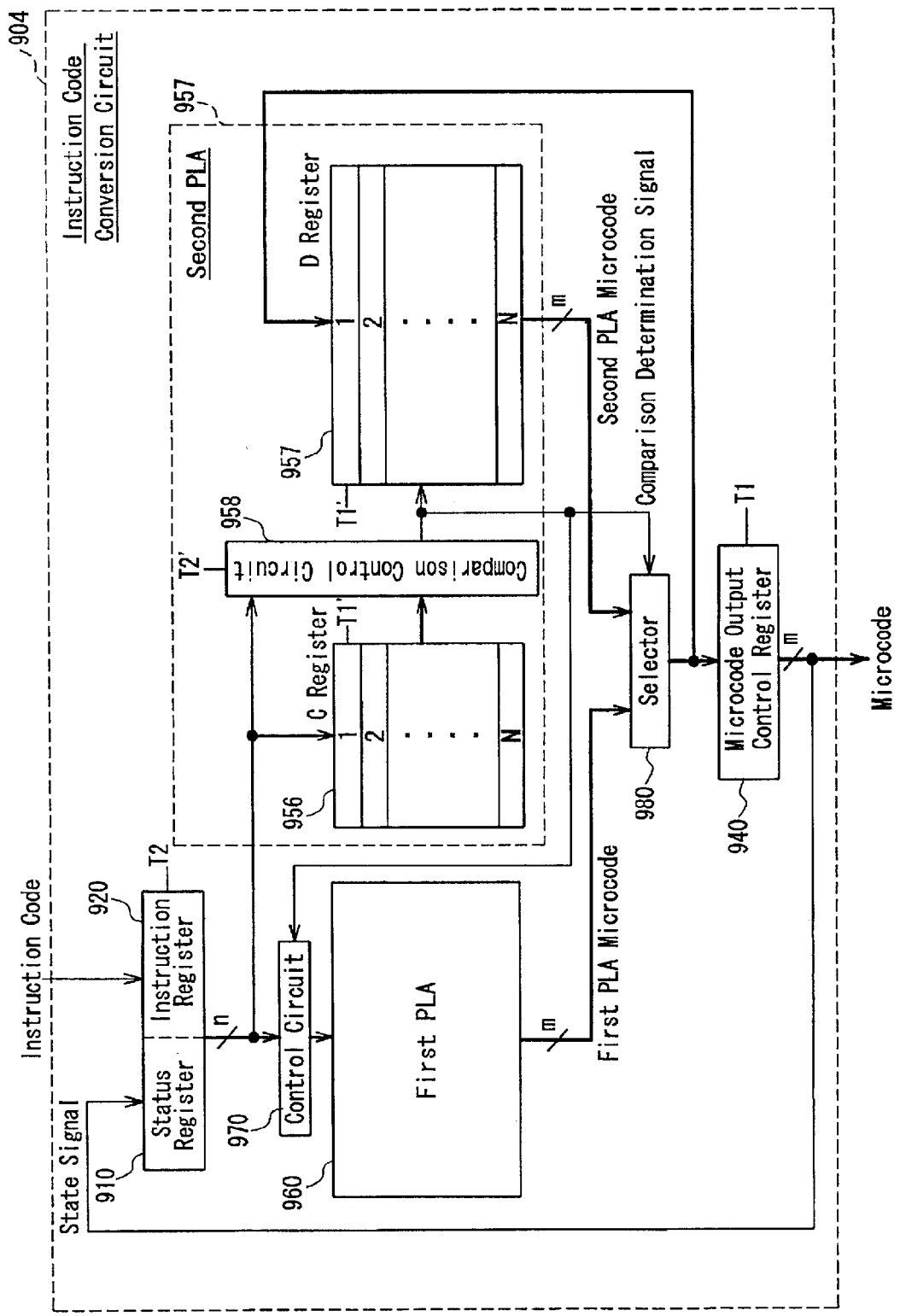
FIG. 7 is a block diagram illustrating a configuration of an instruction code conversion circuit 904 according to a fourth embodiment of the present invention.

FIG. 7 is a block diagram illustrating a configuration of an instruction code conversion circuit 904 included in a microprocessor according to the fourth embodiment of the present invention.

In FIG. 7, 956 denotes a C register (first register) that is the A register 951 shown in FIG. 1, further having a function of fetching output data from the instruction register 920 and the status register 910 at a timing T1' and shifting the same to a next stage at a subsequent timing T1'.

957 denotes a D register (second register) that is the B register 952 shown in FIG. 1, further having a function of fetching output data from the selector 980 at a timing T1' and shifting the same to a next stage at a subsequent timing T1'.

958 denotes a comparison control circuit that is the comparison control circuit 953 shown in FIG. 1 from which the input of a slow mode setting signal is omitted, and therefore the comparison control circuit 958 has a function such that the slow mode is omitted from the matching requirements of the comparison control circuit 953.

As compared with the instruction code conversion circuit 901 according to the first embodiment, which is effective for the reduction of the power consumption in the slow mode, the instruction code conversion circuit 904 according to the fourth embodiment has the following characteristic features: by changing the values set into the C register 956 and the D register 957 dynamically, the power consumption is reduced effectively according to the frequency of execution of an instruction, irrespective of the operational mode; and there is no need to make instruction codes, state data, and microcodes open.

Next, an operation of the instruction code conversion circuit 904 configured as above will be described below, with reference to FIG. 8. Note that in FIG. 8, a timing T1' denotes a delay timing of T1.

In the microprocessor according to the fourth embodiment, the setting of the C register 956 and the D register 957 for initialization as in the first embodiment is unnecessary.

The following will describe a case in which, as in the first embodiment, the operation of the microprocessor switches from the normal mode to the slow mode, and an execution instruction code matches data in the C register 956.

Figure 8:
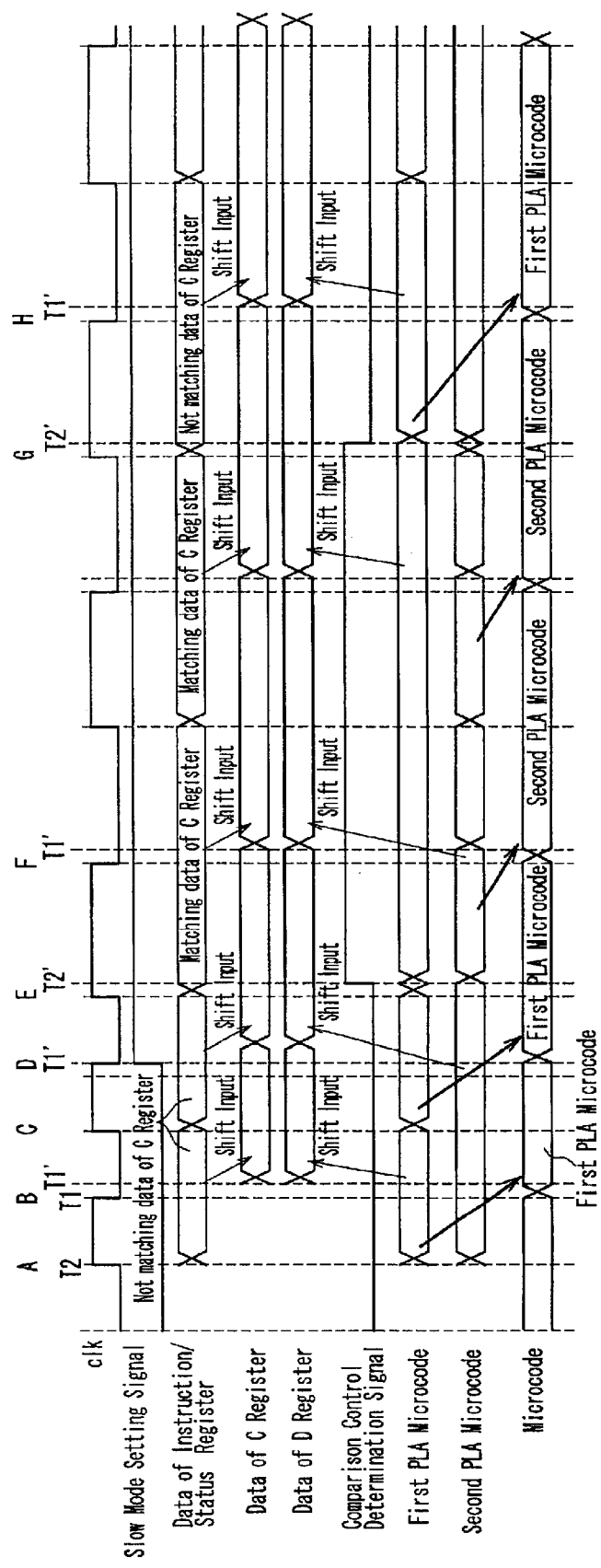
FIG. 8 is an operation timing chart of the instruction code conversion circuit 904 shown in FIG. 7.

At a timing A in FIG. 8, the comparison control circuit 958 outputs the logic "L" as a comparison determination signal, since data in the instruction register 920 and the status register 910 do not match data in the C register 956. The operation for microcode output control is identical to that in the first embodiment.

At a timing B, the microcode output control register 940 latches an output signal from the selector 980 at a timing T1, and outputs the same as a microcode. At a timing T1', data in the instruction register 920 and the status register 910 are fetched by the C register 956 to its first stage, while the output signal from the selector 980 is fetched by the D register 957 to its first stage.

At a timing C, the same operations as that at the timing A are carried out.

At a timing D, the same operations as that at the timing B are carried out. It should be noted that the slow mode setting signal is switched from the logic "L" to the logic "H", but in the present embodiment, the slow mode setting signal does not influence the operation of the instruction code conversion circuit 904. At a next timing T1', data in the instruction register 920 and the status register 910 are sent to the C register 956 while the data fetched at the timing T1' of the previous cycle are shifted to the second stage, and an output signal from the selector 980 is fed to the D register 957 while the data fetched at the timing T1' of the previous cycle are shifted to the second stage.

At a timing E, when data in the instruction register 920 and the status register 910 match the data in the first stage of the C register 956, the comparison determination signal is switched from the logic "L" to the logic "H" at a timing T2', thus exhibiting the matching state. The D register 957 outputs the code in the first stage corresponding to the first stage of the C register 956 as a second PLA microcode at a timing T2', and the selector 980 selects and outputs the second PLA microcode. Further, the control circuit 970 masks the output signal to the first PLA 960 so as to cause the first PLA 960 to stop the circuit operation.

At a timing F, as in the first embodiment, the second PLA microcode is outputted as a microcode. At a next timing T1', data are fetched by the C register 956 and the D register 957 and the data already present therein are shifted to the next stages, respectively, as at the timing T1' of the previous cycle.

The following will describe a case where the operation of the microprocessor is in the slow mode and transition occurs from a state in which the execution instruction code and the data in the C register 956 match each other to a state in which they do not match.

At a timing G, even when the non-matching is recognized and the comparison determination signal is switched from the logic "H" to the logic "L" at a timing T2', the selector 980 selects the first PLA microcode, as in the first embodiment.

At a timing H, the same operation as that in the first embodiment is carried out. At a next timing T1', data are fetched by the C register 956 and the D register 957, and data already present therein are shifted to the next stages.

As described above, according to the present embodiment, the second PLA 950, whose power consumption is smaller, is optimized according to the frequency of execution of an instruction. Therefore, it is possible to achieve the reduction of the power consumption irrespective of the operational mode.

Fifth Embodiment

Figure 9:
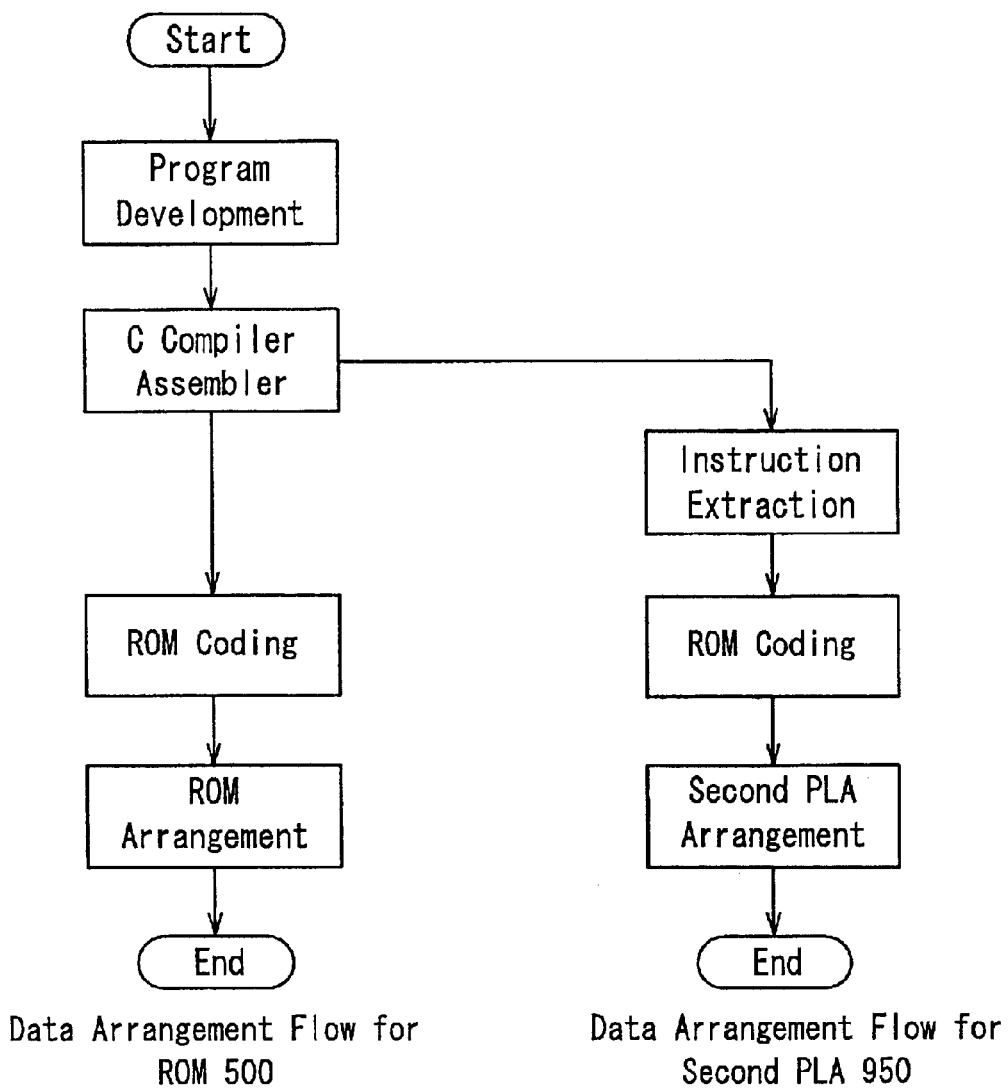
FIG. 9 is a flowchart illustrating a processing procedure in data arrangement for the second PLA 950 in a microprocessor according to a fifth embodiment of the present invention.
Figure 10:
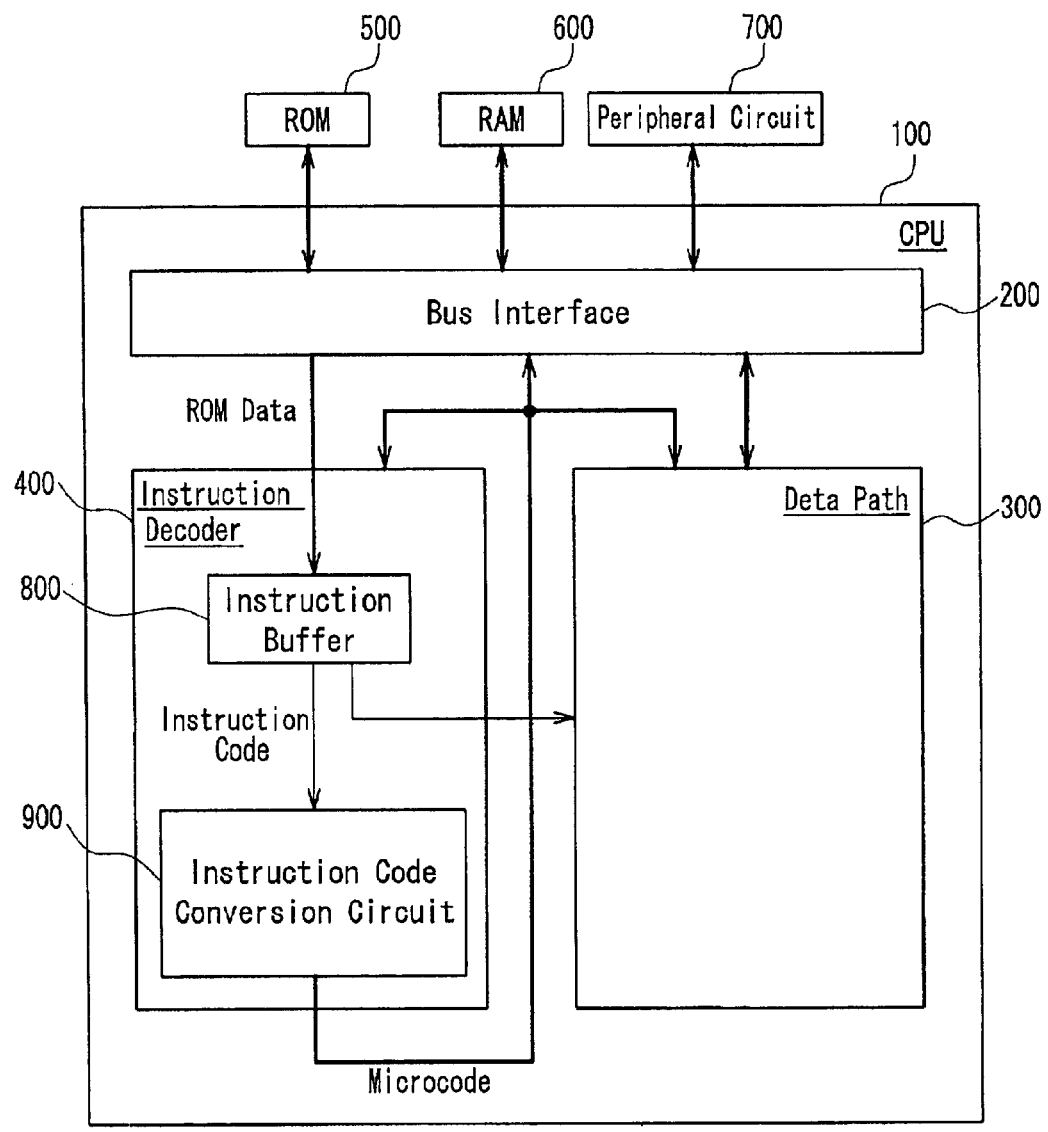
FIG. 10 is a block diagram illustrating a schematic configuration of a common microprocessor.

FIG. 9 is a flowchart illustrating a processing procedure in data arrangement for the second PLA in a microprocessor according to a fifth embodiment of the present invention.

Normally, data in the ROM 500 are arranged in the following manner. Source data produced by program development are converted into a ROM code based on data files generated by a compiler, an assembler, etc., and then is generated as a layout pattern (data arrangement flow for the ROM 500).

In the second and third embodiments, since the second PLA 950 is replaced with a ROM, it is necessary to arrange data as a layout pattern. However, the generation of arrangement data for the second PLA 950 in the arrangement flow such as the normal flow for the ROM 500 makes it necessary for a microprocessor developer (microprocessor manufacturer) to provide a program developer with information of the instruction codes, state data, and microcodes. In this case, there is possibility that the program development is carried out outside the microprocessor manufacturer, which means that detailed information of the performance and architecture of the microprocessor are disclosed.

According to the data arrangement flow for the second PLA 950 shown in FIG. 9, frequently-executed instructions are extracted from a data file generated by a compiler or an assembler based on source data produced by the program development, and ROM codes are generated as instruction codes, state data and microcodes.

The method of data arrangement for the second PLA according to the fifth embodiment causes the microprocessor developer to extract frequently-executed instructions based on source data arranged in the ROM 500, thereby allowing the arrangement data for the second PLA 950 to be generated.

As described above, according to the present embodiment, even if the program development is carried out outside the microprocessor manufacturer, it is possible to make effective use of the characteristic features of the second and third embodiments, without providing information of the instruction codes, state data and microcodes.

As stated above, according to the present invention, the PLA for normal operations and the PLA for the low power consumption are switched therebetween according to an instruction code to be executed and an operational mode, and frequently-executed instructions are set into the PLA for the low power consumption. This makes it possible to achieve a low power consumption optimal for an application.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A microprocessor comprising:
    a first PLA that outputs a first PLA microcode based on an instruction code and a state signal;
    a second PLA that outputs a second PLA microcode and a comparison determination signal based on the instruction code, the state signal, and a slow mode setting signal;

a selecting means that selects either the first PLA microcode or the second PLA microcode according to the comparison determination signal, and outputs the selected one as a microcode; and a control means that activates one of the first and second PLAs and deactivates the other according to the comparison determination signal, wherein the second PLA processes several instructions among all the instructions to be processed by the first PLA, the second PLA including:

a first register that stores instruction codes and state signals for the several instructions;

a second register that stores microcodes that correspond to the instruction codes and the state signals stored in the first register; and a comparison control circuit that compares data in the first register with the instruction codes and the state signals input in a slow mode set according to the slow mode setting signal, and outputs the comparison result as the comparison determination signal, and when the comparison determination signal indicates a matching state, the second PLA outputs the microcode corresponding to the matched data in the first register from the second register as a second PLA microcode.

2. The microprocessor according to claim 1, wherein the control means makes the first PLA in the non-active state by fixing input data to be supplied to the first PLA according to the comparison determination signal.

3. The microprocessor according to claim 1, wherein the first register and the second register comprise read only memory (ROM).

4. The microprocessor according to claim 3, wherein the control means stops power supply to the first PLA according to the comparison determination signal, so as to deactivate the first PLA.

5. The microprocessor according to claim 1, wherein data in the first register are rewritable at all times according to data in the instruction register and the status register, and data in the second register are rewritable at all times according to the microcode.

6. The microprocessor according to claim 3, wherein frequently-executed instructions are extracted from a ROM source file, converted into ROM codes, and arranged in the second PLA.

* * * * *